United States Patent
Huang et al.

(10) Patent No.: US 8,565,428 B2
(45) Date of Patent: Oct. 22, 2013

(54) NETWORK DEVICE AND NETWORK CONNECTING METHOD FOR BUILDING UP NETWORK CONNECTION VIA HIGH DEFINITION MULTIMEDIA INTERFACE

(75) Inventors: Liang-Wei Huang, Hsinchu (TW); Shieh-Hsing Kuo, Hsinchu (TW); Chun-Hung Liu, New Taipei (TW); Kai-Wen Cheng, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 110 days.

(21) Appl. No.: 13/304,691

(22) Filed: Nov. 28, 2011

(65) Prior Publication Data

US 2012/0137162 A1    May 31, 2012

(30) Foreign Application Priority Data

Nov. 29, 2010  (TW) .............................. 99141243 A (51) Int. Cl.
*G06F 11/10* (2006.01)
*H04L 9/00* (2006.01)
*H04N 1/44* (2006.01)

(52) U.S. Cl.
USPC ...... 380/210; 714/2; 714/3; 714/49; 714/715; 714/819

(58) Field of Classification Search
USPC ................. 380/210; 714/2, 3, 49, 715, 819
See application file for complete search history.

(56) References Cited

U.S. PATENT DOCUMENTS

| | | | |
|---|---|---|---|
| 5,461,661 A * | 10/1995 | Buttle | 379/3 |
| 7,797,536 B1 * | 9/2010 | Lyle | 713/168 |
| 2002/0097472 A1 * | 7/2002 | Oettinger et al. | 359/172 |
| 2002/0161542 A1 * | 10/2002 | Jones et al. | 702/108 |
| 2008/0098234 A1 * | 4/2008 | Driscoll et al. | 713/189 |
| 2009/0116548 A1 * | 5/2009 | Lida et al. | 375/240.01 |
| 2009/0116583 A1 * | 5/2009 | Lida et al. | 375/296 |
| 2009/0147864 A1 * | 6/2009 | Lida et al. | 375/257 |
| 2010/0020179 A1 * | 1/2010 | Horan et al. | 348/181 |
| 2010/0023825 A1 * | 1/2010 | Stakely et al. | 714/738 |

FOREIGN PATENT DOCUMENTS

TW    200941973    10/2009

OTHER PUBLICATIONS

Menezes, Alfred J. et al. Handbook of Applied Cryptography, 1997 CRC Press, LLC, pp. 397-402.*

* cited by examiner

*Primary Examiner* — Michael Simitoski
(74) *Attorney, Agent, or Firm* — Winston Hsu; Scott Margo (57) ABSTRACT

A network device for building up a network connection via a high-definition multimedia interface, includes a scrambler, a descrambler, a comparator and a control unit. The scrambler is utilized for generating a transmission signal according to a first seed. The descrambler is for decoding a receiving signal to generate a second seed. The comparator is for generating a comparing result according to the first seed and the second seed. The control unit is for controlling the network connection according to the comparing result.

16 Claims, 10 Drawing Sheets

NETWORK DEVICE AND NETWORK CONNECTING METHOD FOR BUILDING UP NETWORK CONNECTION VIA HIGH DEFINITION MULTIMEDIA INTERFACE

BACKGROUND

1. Technical Field

The disclosure relates to a network device and a network connecting method for building up network connections via a high-definition multimedia interface (HDMI).

2. Description of the Related Art

In the high-definition multimedia interface (HDMI) standard version 1.4, a transmission signal and a receiving signal of a network device are transmitted on a single pair of transmission line. For this reason, the transmission signal is likely to bounce back and cause echo, which may further affects the quality of the receiving signal. Especially, when both the network device and another network device send out the same signal (for example, an idle sequence) at the same time, the signal from another network device will be the same as the echo signal caused by the transmission signal of the network device. Under this condition, the receiving end of the network device is unable to distinguish whether the received signal is from the other network device or the echo signal caused by the transmission signal. For this reason, the echo signal caused by the transmission signal may be mistaken as the signal from the other network device, which may fail in building up a network connection.

Furthermore, as long as the transmitting end is power on, the transmitting end keeps sending out the transmission signal and the receiving end keeps detecting whether it's converged continuously. During the initial network connection, the echo signal caused by the transmission signal will be mistaken as the signal from the other network device, which may result in not only connection failure but also unnecessary power consumption and waste of power.

Hence, how to solve the problem of echo interference and how to lower the power consumption of the network device have become an important issue to be solved by designers skilled in this field.

BRIEF SUMMARY

It is therefore one of the objectives of the disclosure to provide a network device and a network connecting method for building up network connections via HDMI, such that the problems of echo interference caused by the transmission signal can be solved by comparing a time distance between a first seed of the transmission signal and a second seed of the receiving signal with a threshold during the initial network connection.

According to an exemplary embodiment, a network device for building up a network connection via a high-definition multimedia interface (HDMI) is provided. The network device may include a scrambler, a descrambler, a comparator and a control unit. The scrambler is utilized for generating a transmission signal according to a first seed. The descrambler is coupled to the scrambler, for decoding a receiving signal to generate a second seed. The comparator is coupled to the scrambler and the descrambler, for generating a comparing result according to the first seed and the second seed. The control unit is coupled to the comparator, for controlling the network connection according to the comparing result.

According to an exemplary embodiment, a method for building up a network connection via a high-definition multimedia interface (HDMI) is provided. The method includes the following steps: generating a transmission signal according to a first seed; decoding a receiving signal to generate a second seed; generating a comparing result according to the first seed and the second seed; and controlling the network connection according to the comparing result.

Therefore, by comparing a time distance between the first seed and the second seed in the disclosure, the receiving signal received by the receiving unit of the network device can be determined to check whether it is the signal from another network device or it is the echo signal resulted form the transmission signal. As a result, the problems of echo interference caused by the transmission signal can be avoided. Furthermore, by controlling the transmitting unit to stop sending the transmission signal for a predetermined time duration, a power-saving effect can be achieved.

These and other objectives of the disclosure will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
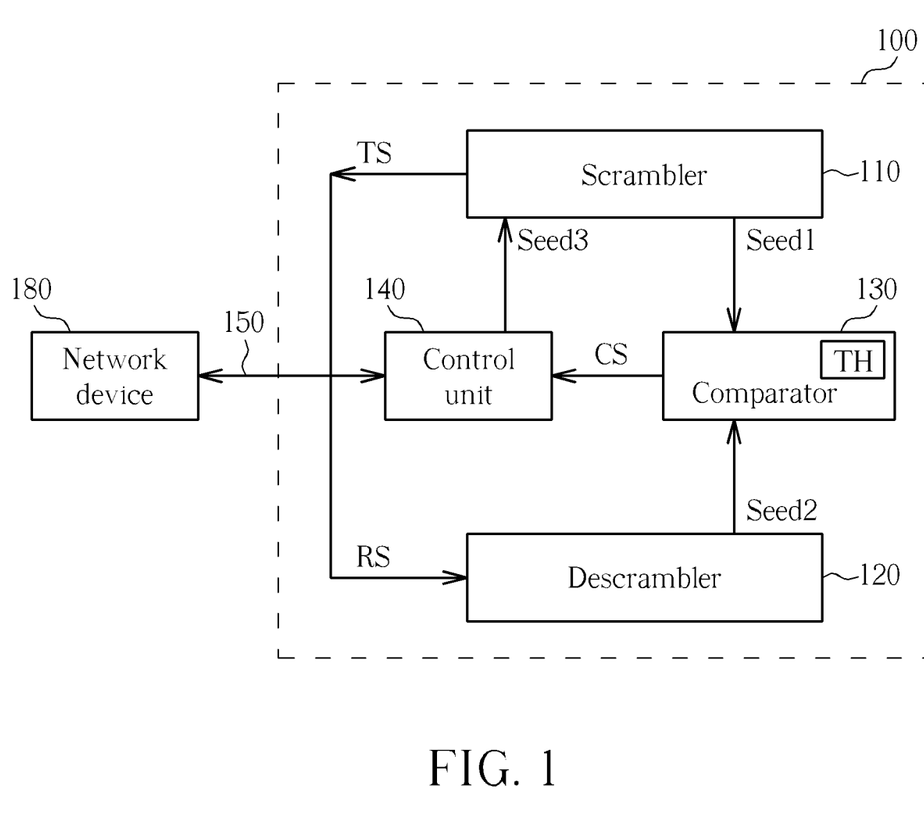
FIG. 1 is a block diagram illustrating a network device for building up a network connection via a high-definition multimedia interface (HDMI) according to a first embodiment.

Please refer to FIG. 1. FIG. 1 is a block diagram illustrating a network device 100 for building up a network connection via a high-definition multimedia interface (HDMI) 150 according to a first embodiment. As shown in FIG. 1, the network device 100 may include, but is not limited to, a scrambler 110, a descrambler 120, a comparator 130 and a control unit 140. During the initial network connection, the scrambler 110 is arranged for generating a transmission signal TS according to a first seed SEED1. Please note that, in this embodiment, the transmission signal TS can use an idle sequence as an example, but the disclosure is not limited to this only. The descrambler 120 is coupled to the scrambler 110, and is arranged for decoding a receiving signal RS to generate a second seed SEED2. In addition, the comparator 130 is coupled to the scrambler 110 and the descrambler 120, and is arranged for generating a comparing result CS according to the first seed SEED1 and the second seed SEED2. The control unit 140 is coupled to the comparator 130, and is arranged for controlling the network connection according to the comparing result CS. For example, when the comparing result RS indicates that a time distance between the first seed SEED1 and the second seed SEED2 is smaller than a threshold TH (such as, 20), that is, the first seed SEED1 sent from the network device 100 is too close to the second seed SEED2 received by the network device 100, the receiving signal RS most likely could be echo signals caused by the transmission signal TS, rather than the signal transmitted from another network device 180. For this reason, the control unit 140 may determine that the efficient working of the current network connection is not guaranteed and a new network connection is required. Therefore, the control unit 140 will generate a third seed SEED3 to update the first seed SEED1.

Figure 2:
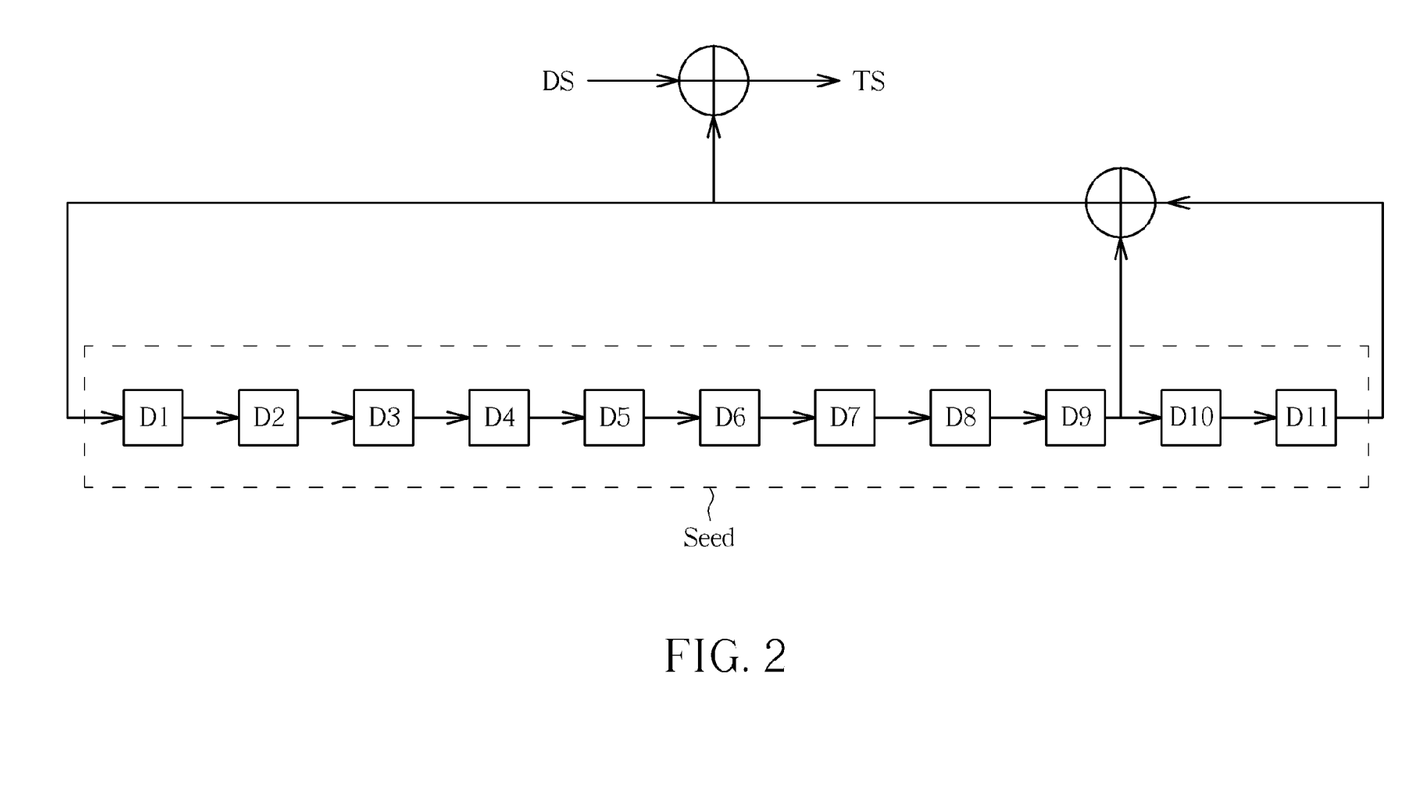
FIG. 2 is a diagram illustrating the scrambler for generating a transmission signal by referring a first seed according to an embodiment.

Please refer to FIG. 1 together with FIG. 2. FIG. 2 is a diagram illustrating the scrambler 110 for generating a transmission signal by referring a first seed according to an embodiment. In simple terms, the scrambler 110 is a device used for scattering a data stream DS into another data stream with a series of discrete ones "1" and discrete zeros "0" at the transmitting side. As a result, the receiving side is able to obtain the accuracy of sampling rate, and it makes the probability of occurrence of "1" and "0" nearly half, respectively. That is to say, the data can become random so as to achieve the optimum decoding error rate. In this embodiment, during the initial network connection, the control unit 140 may select an initial value of a set of registers D1-D11 as the first seed SEED1, wherein the initial value of the set of registers D1-D11 includes 11 bits selected from a periodical pseudo-noise sequence (PN sequence) having a length of 2047 bits, and the pseudo-noise sequence repeats every 2407 bits. That is to say, the cycle time of the first seed SEED1 is equal to 2047. After performing logic operations upon the first seed SEED1 and the data stream SD, the transmission signal TS is generated accordingly. Furthermore, the number of the registers D1-11 is merely for illustrating the features of the disclosure, and by no means to be considered as limitations of the disclosure. In addition, constituent circuits of the descrambler 120 are similar to constituent circuits of the scrambler 110, and thus the descrambler 120 is capable of decoding the second seed SEED2 from the receiving signal RS. Please note that, as a person skilled in the art can readily understand detailed operating principles of the scrambler 110 and the descrambler 120, further description is omitted here for brevity.

Figure 3:
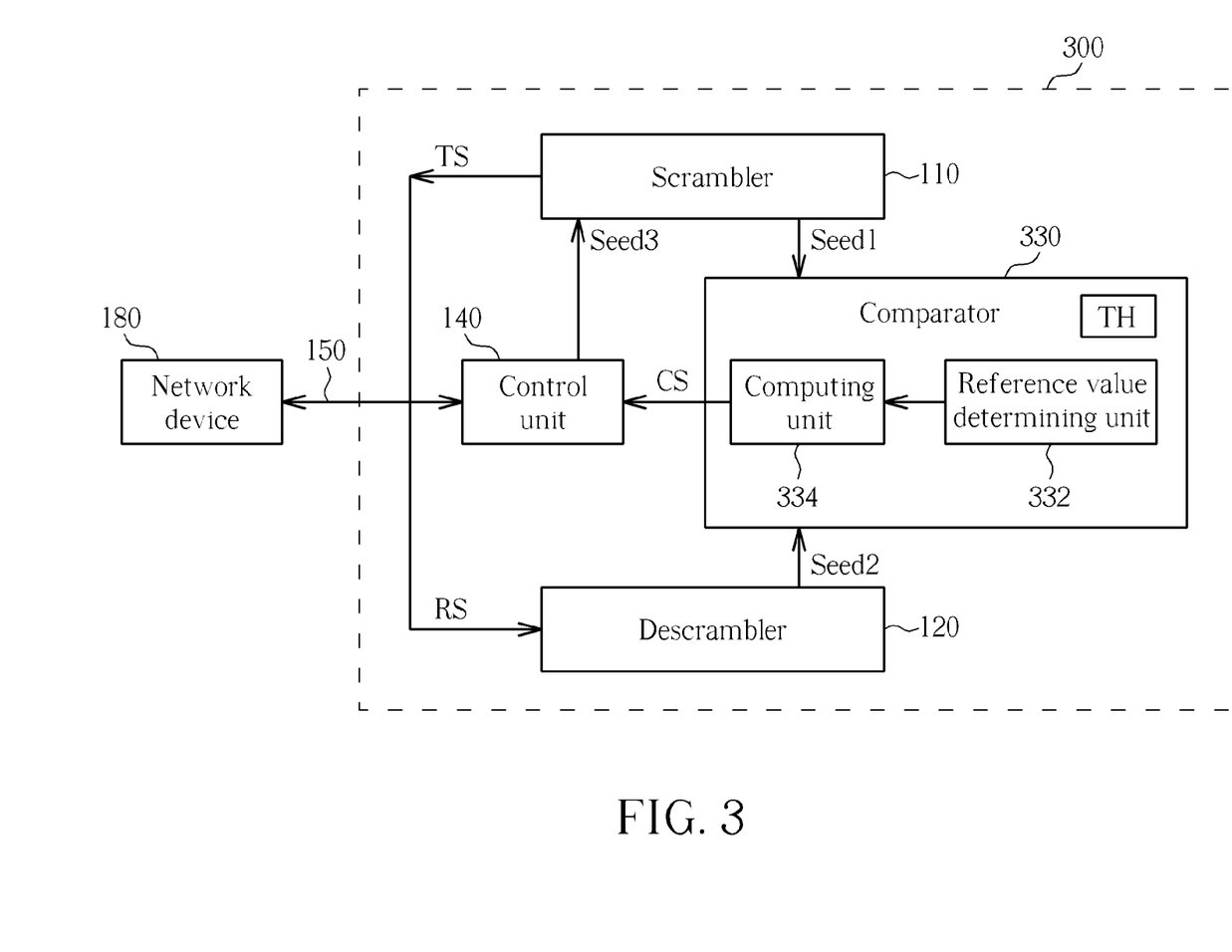
FIG. 3 is a block diagram illustrating a network device for building up a network connection via HDMI according to a second embodiment.
Figure 3A:
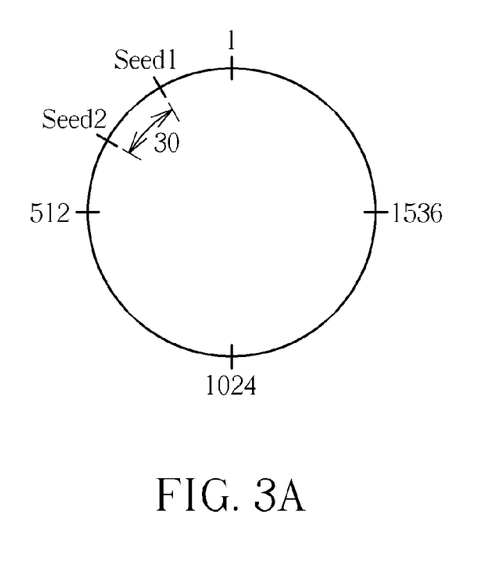
FIG. 3A is a diagram illustrating the comparator for generating the comparing result according to a first embodiment.

Please refer to FIG. 3. FIG. 3 is a block diagram illustrating a network device 300 for building up a network connection via HDMI 150 according to a second embodiment. The architecture of the network device 300 shown in FIG. 3 is similar to that of the network device 100 shown in FIG. 1, and the major difference between them is that: a comparator 330 of the network device 300 further includes a reference value determining unit 332 and a computing unit 334. The reference value determining unit 332 may be arranged for determining at least one seed position reference value. The computing unit 334 is coupled to the reference value determining unit 332, and may be arranged for generating the comparing result CS according to the at least one seed position reference value, the first seed SEED1, and the second seed SEED2. For example, please refer to FIG. 3A. FIG. 3A is a diagram illustrating the comparator for generating the comparing result according to a first embodiment. As shown in FIG. 3A, the reference value determining unit 332 may use the first seed SEED2 as the seed position reference value. If a time distance, between the first seed SEED1 and the second seed SEED2, counted by the computing unit 340 is equal to 30, the comparing result CS is determined to be 30.

Figure 3B:
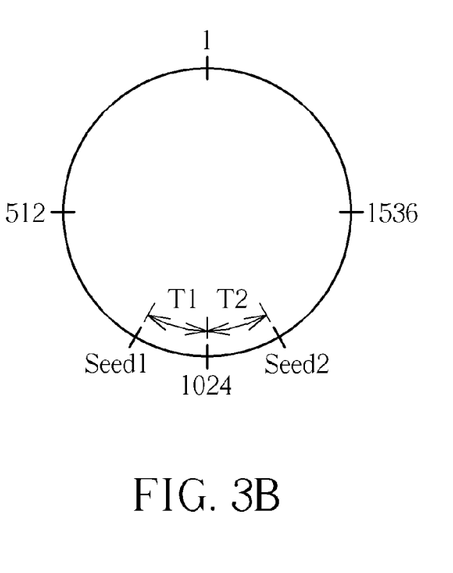
FIG. 3B is a diagram illustrating the comparator for generating the comparing result according to a second embodiment.

Please refer to FIG. 3B. FIG. 3B is a diagram illustrating the comparator for generating the comparing result according to a second embodiment. As shown in FIG. 3B, in other embodiments, the reference value determining unit 332 may use a middle position (such as, 1024) of the pseudo-noise sequence as the seed position reference value. At this time, the computing unit 334 then determine the comparing result CS by calculating a sum of a first time distance T1, between the first seed SEED1 and the middle position, and a second time distance T2, between the second seed SEED2 and the middle position. For example, if the first time distance T1 between the first seed SEED1 and the middle position is equal to 10 and the second time distance T2 between the second seed SEED2 and the middle position is equal to 15, the comparing result CS is determined to be 25 (i.e., 10+15=25).

Figure 3C:
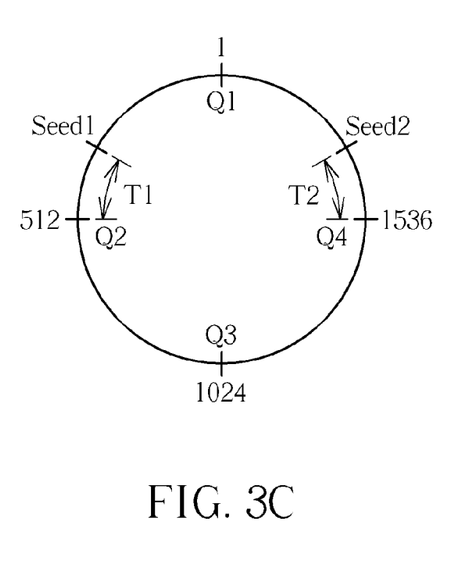
FIG. 3C is a diagram illustrating the comparator for generating the comparing result according to a third embodiment.

Please refer to FIG. 3C. FIG. 3C is a diagram illustrating the comparator for generating the comparing result according to a third embodiment. As shown in FIG. 3C, the reference value determining unit 332 may divide the pseudo-noise sequence into four equal portions, and may use their corresponding positions (such as, Q1, Q2, Q3, and Q4) as four seed position reference values. If the first time distance between the first seed SEED1 and the seed position reference value Q2 counted by the computing unit 340 is equal to 10 counted, and the second time distance between the second seed SEED2 and the seed position reference value Q4 counted by the computing unit 340 is equal to 15, the comparing result CS is determined to be 1049(i.e., 10+15+1024=1049).

As can be known from above, the number of the seed position reference values set by the reference value determining unit 332 gets large, the time distance between the first seed and the seed position reference value can be calculated by the computing unit 334 more quickly so as to have a higher efficiency. Please note that, the number of the seed position reference values mentioned in the embodiments above are presented merely to illustrate practicable designs of the disclosure, and should be considered to be limitations of the scope of the disclosure. Various modifications of calculating the time distance between the first seed SEED1 and the second SEED2 may be made without departing from the spirit of the disclosure, which also belongs to the scope of the disclosure.

Figure 4:
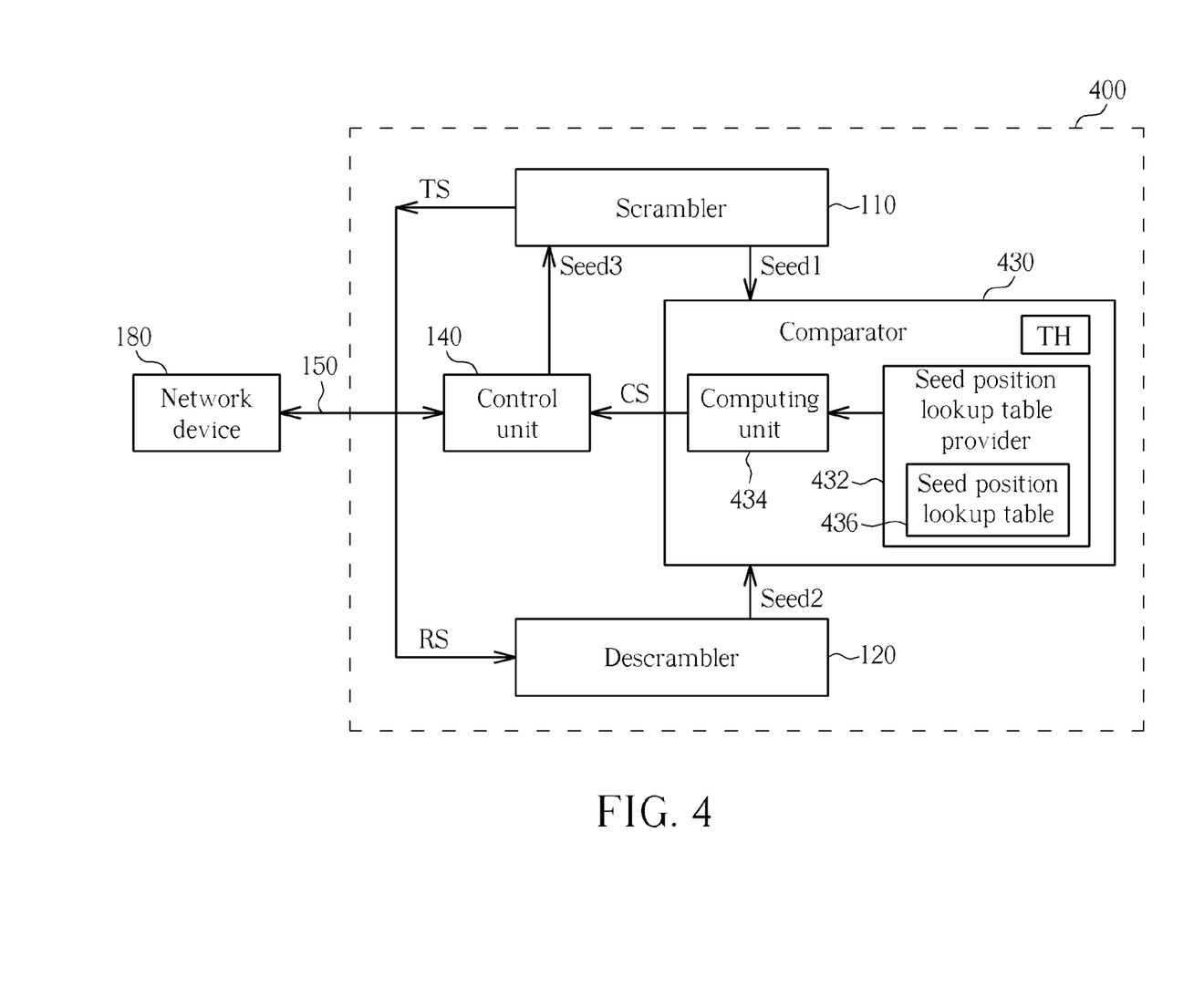
FIG. 4 is a block diagram illustrating a network device for building up a network connection via HDMI according to a third embodiment.

Please refer to FIG. 4. FIG. 4 is a block diagram illustrating a network device 400 for building up a network connection via HDMI 150 according to a third embodiment. The architecture of the network device 400 shown in FIG. 4 is similar to that of the network device 300 shown in FIG. 3, and the major difference between them is that: a comparator 430 of the network device 400 includes a seed position lookup table provider 432 and a computing unit 434. The seed position lookup table provider 432 may be arranged for providing a seed position lookup table 436. The computing unit 434 is coupled to the seed position lookup table provider 434, and may be arranged for generating the comparing result CS according to the seed position lookup table 436, the first seed SEED1, and the second seed SEED2. For example, the computing unit 434 finds that the position of the first seed SEED1 is equal to 20 and the position of the second seed SEED2 is equal to 35, the comparing result CS is determined to be 15 (i.e., 35−20=15). As one can see, in this embodiment, by using the seed position lookup table 436, the time distance between the first seed SEED1 and the second seed SEED2 can be calculated quickly.

Figure 5:
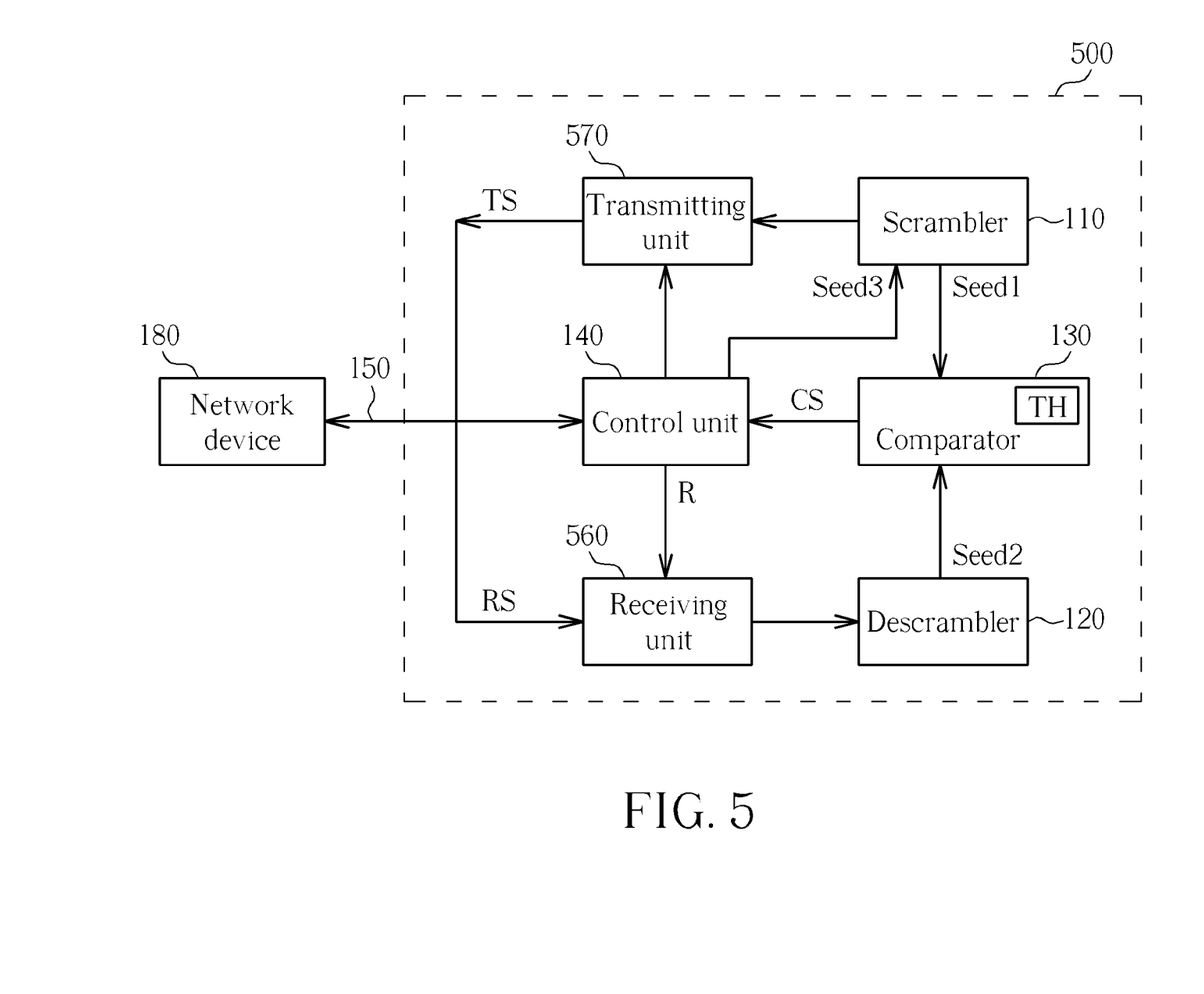
FIG. 5 is a block diagram illustrating a network device for building up a network connection via HDMI according to a fourth embodiment.

Please refer to FIG. 5. FIG. 5 is a block diagram illustrating a network device 500 for building up a network connection via HDMI 150 according to a fourth embodiment. The architecture of the network device 500 shown in FIG. 5 is similar to that of the network device 100 shown in FIG. 1, and the major difference between them is that: the network device 500 shown in FIG. 5 further includes a receiving unit 560 and a transmitting unit 570. The transmitting unit 570 is arranged for sending the transmission signal TS, and the receiving unit 560 is arranged for receiving the receiving signal from another network device. When the comparing result CS indicates that the time distance between the first seed SEED1 and the second seed SEED2 is smaller than the threshold TH, the control unit 140 may generate a reset signal R to rest the receiving unit 560. Moreover, the control unit 140 may further generate a third seed SEED3 to update the first seed SEED1. After that, the control unit 140 may notify the transmitting unit 570 to stop sending the transmission signal TS for a predetermined time duration (such as, 2 seconds), and enable the transmitting unit 570 to re-send the transmission signal TS later. In other words, if the receiving signal is not converged yet, the transmitting unit 570 can be disabled for a predetermined time duration so as to achieve a power-saving effect. Please note that, when the transmitting unit 570 is under a disable status for stopping sending the transmission signal TS and the receiving signal RS received by the receiving unit 560 is converged, the control unit 140 may enable the transmitting unit 570 to re-send the transmission signal TS for building up the network connection.

Figure 6:
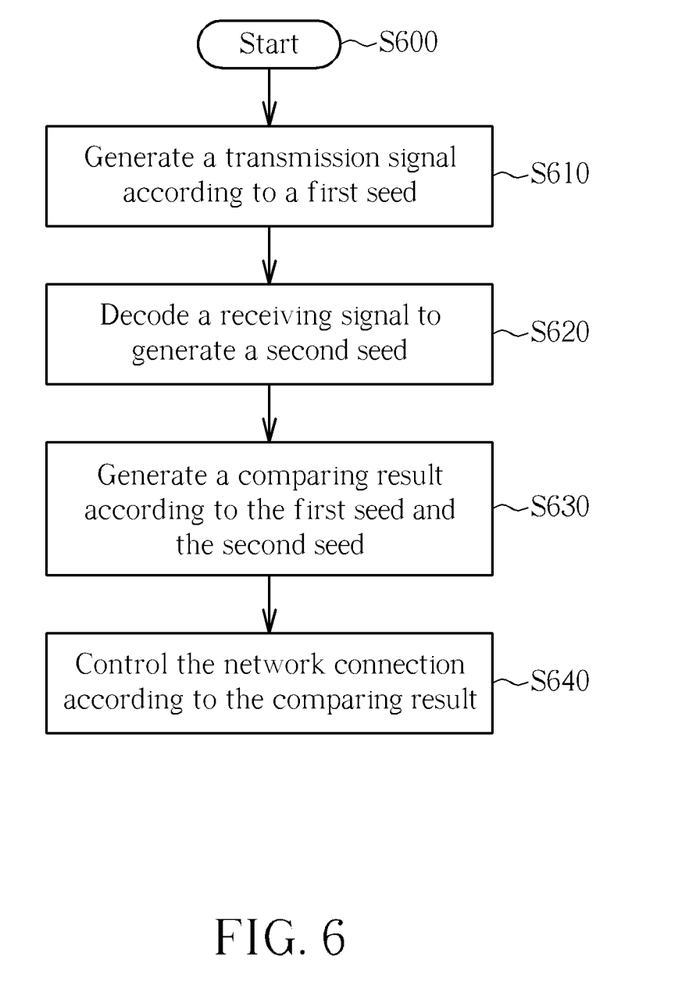
FIG. 6 is a flowchart illustrating a method for building up a network connection via HDMI according to a first exemplary embodiment.

Please refer to FIG. 6. FIG. 6 is a flowchart illustrating a method for building up a network connection via HDMI according to a first exemplary embodiment. Please note that the following steps are not limited to be performed according to the exact sequence shown in FIG. 6 if a roughly identical result can be obtained. The method includes, but is not limited to, the following steps:

Step S600: Start.

Step S610: Generate a transmission signal according to a first seed.

Step S620: Decode a receiving signal to generate a second seed.

Step S630: Generate a comparing result according to the first seed and the second seed.

Step S640: Control the network connection according to the comparing result.

How each element operates can be known by collocating the steps shown in FIG. 6 and the elements shown in FIG. 1, and further description is omitted here for brevity.

Figure 7:
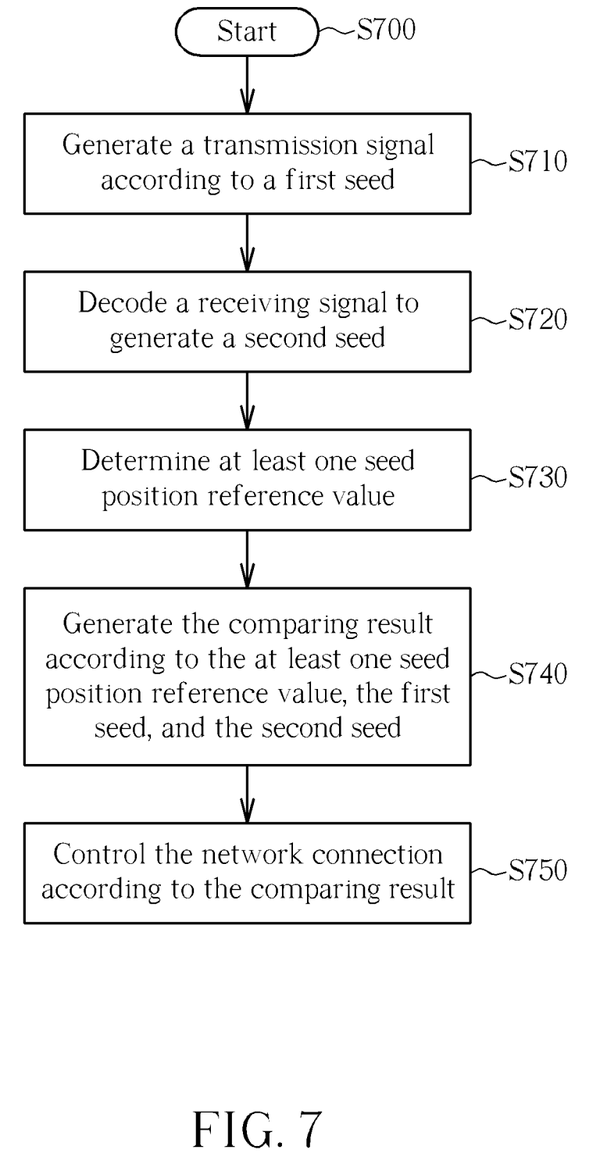
FIG. 7 is a flowchart illustrating a method for building up a network connection via HDMI according to a second exemplary embodiment.

Please refer to FIG. 7. FIG. 7 is a flowchart illustrating a method for building up a network connection via HDMI according to a second exemplary embodiment. Please note that the following steps are not limited to be performed according to the exact sequence shown in FIG. 7 if a roughly identical result can be obtained. The method includes, but is not limited to, the following steps:

Step S700: Start.

Step S710: Generate a transmission signal according to a first seed.

Step S720: Decode a receiving signal to generate a second seed.

Step S730: Determine at least one seed position reference value.

Step S740: Generate the comparing result according to the at least one seed position reference value, the first seed, and the second seed.

Step S750: Control the network connection according to the comparing result.

How each element operates can be known by collocating the steps shown in FIG. 7 and the elements shown in FIG. 3, and further description is omitted here for brevity. Herein the step S730 can be executed by the reference value determining unit 332, and the step S740 can be executed by the computing unit 334.

Figure 8:
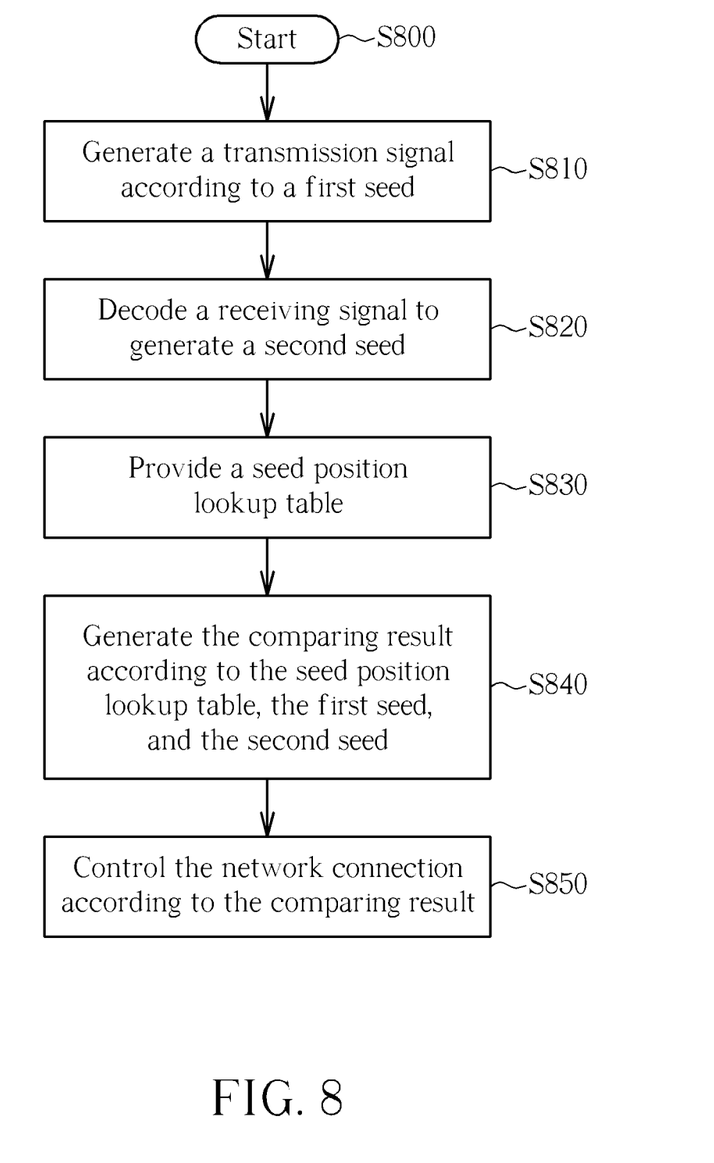
FIG. 8 is a flowchart illustrating a method for building up a network connection via HDMI according to a third exemplary embodiment.

Please refer to FIG. 8. FIG. 8 is a flowchart illustrating a method for building up a network connection via HDMI according to a third exemplary embodiment. Please note that the following steps are not limited to be performed according to the exact sequence shown in FIG. 8 if a roughly identical result can be obtained. The method includes, but is not limited to, the following steps:

Step S800: Start.

Step S810: Generate a transmission signal according to a first seed.

Step S820: Decode a receiving signal to generate a second seed.

Step S830: Provide a seed position lookup table.

Step S840: Generate the comparing result according to the seed position lookup table, the first seed, and the second seed.

Step S850: Control the network connection according to the comparing result.

How each element operates can be known by collocating the steps shown in FIG. 8 and the elements shown in FIG. 4, and further description is omitted here for brevity. Herein the step S830 can be executed by the seed position lookup table provider 432, and the step S840 can be executed by the computing unit 434.

Figure 9:
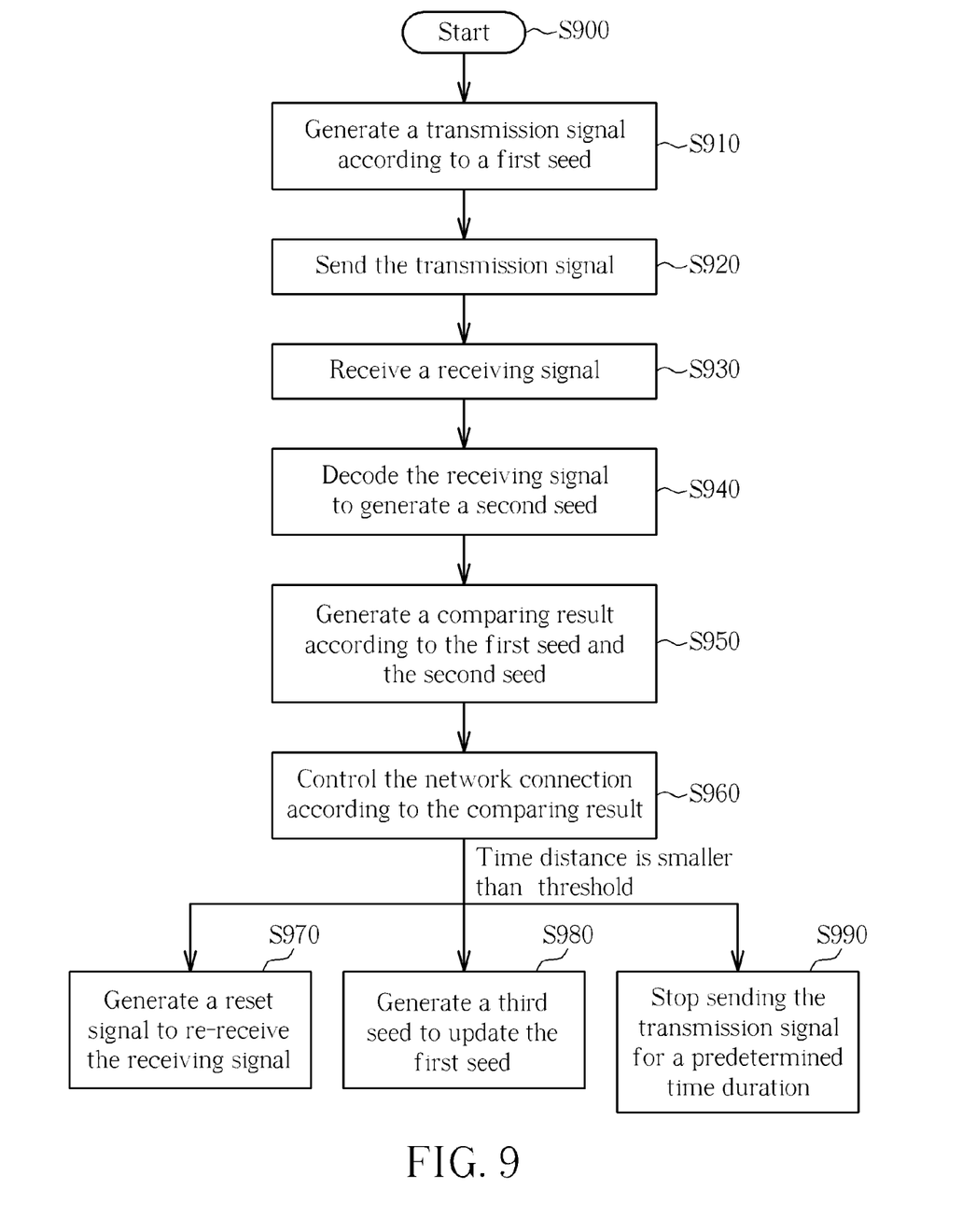
FIG. 9 is a flowchart illustrating a method for building up a network connection via HDMI according to a fourth exemplary embodiment.

Please refer to FIG. 9. FIG. 9 is a flowchart illustrating a method for building up a network connection via HDMI according to a fourth exemplary embodiment. Please note that the following steps are not limited to be performed according to the exact sequence shown in FIG. 9 if a roughly identical result can be obtained. The method includes, but is not limited to, the following steps:

Step S900: Start.

Step S910: Generate a transmission signal according to a first seed.

Step S920: Send the transmission signal.

Step S930: Receive a receiving signal.

Step S940: Decode the receiving signal to generate a second seed.

Step S950: Generate a comparing result according to the first seed and the second seed.

Step S960: Control the network connection according to the comparing result. When the comparing result indicates that a time distance between the first seed and the second seed is smaller than a threshold, select one of the following steps including S970, S980, and S990.

Step S970: Generate a reset signal to re-receive the receiving signal.

Step S980: Generate a third seed to update the first seed.

Step S990: Stop sending the transmission signal for a predetermined time duration.

How each element operates can be known by collocating the steps shown in FIG. 9 and the elements shown in FIG. 5, and further description is omitted here for brevity.

Please note that, the steps of the abovementioned flowcharts are merely practicable embodiments, and in no way should be considered to be limitations of the scope of the disclosure. These methods can include other intermediate steps or several steps can be merged into a single step without departing from the spirit of the disclosure.

The abovementioned embodiments are presented merely to illustrate practicable designs of the disclosure, and should be considered to be limitations of the scope of the disclosure. In summary, a network device and a network connecting method for building up network connections via HDMI are provided in the disclosure. During the initial network connection, the problems of echo interference caused by the transmission signal can be avoided by comparing a time distance between a first seed of a transmission signal and a second seed of a receiving signal, such that network connection errors can be avoided. In addition, when the receiving signal is not converged yet, a power-saving effect can be achieved by controlling the transmitting unit to stop sending the transmission signal for a predetermined time duration.

Those skilled in the art will readily observe that numerous modifications and alterations of the device and method may be made while retaining the teachings of the invention.

What is claimed is:

1. A network device for building up a network connection via a high-definition multimedia interface (HDMI), the network device comprising:
    a scrambler, arranged for generating a transmission signal according to a first seed;
    a descrambler, arranged for decoding a receiving signal to generate a second seed;
    a comparator, for generating a comparing result according to the first seed and the second seed, wherein the comparing result indicates a time distance between the first seed and the second seed; and
    a control unit, arranged for controlling the network connection according to the comparing result.

2. The network device of claim 1, wherein the comparator comprises:
    a reference value determining unit, arranged for determining at least one seed position reference value; and
    a computing unit, arranged for generating the comparing result according to the at least one seed position reference value, the first seed, and the second seed.

3. The network device of claim 1, wherein the comparator comprises:
    a seed position lookup table provider, arranged for providing a seed position lookup table; and
    a computing unit, arranged for generating the comparing result according to the seed position lookup table, the first seed, and the second seed.

4. The network device of claim 1, wherein the network device further comprises a receiving unit, arranged for receiving the receiving signal;
and when the comparing result indicates that the time distance between the first seed and the second seed is smaller than a threshold, the control unit generates a reset signal to reset the receiving unit.

5. The network device of claim 1, wherein when the comparing result indicates that the time distance between the first seed and the second seed is smaller than a threshold, the control unit further generates a third seed to update the first seed.

6. The network device of claim 1, wherein the network device further comprises a transmitting unit, arranged for sending the transmission signal; and when the comparing result indicates that the time distance between the first seed and the second seed is smaller than a threshold, the control unit notifies the transmitting unit to stop sending the transmission signal for a predetermined time duration.

7. The network device of claim 6, wherein when the transmitting unit stops sending the transmission signal and the receiving signal is converged, the control unit enables the transmitting unit to re-send the transmission signal for building up the network connection.

8. The network device of claim 1, wherein the transmission signal comprises an idle sequence.

9. A method for building up a network connection via a high-definition multimedia interface (HDMI), comprising:
    generating a transmission signal according to a first seed;
    decoding a receiving signal to generate a second seed;
    generating a comparing result according to the first seed and the second seed, wherein the comparing result indicates a time distance between the first seed and the second seed; and
    controlling the network connection according to the comparing result.

10. The method of claim 9, wherein the step of generating the comparing result according to the first seed and the second seed further comprises:
    determining at least one seed position reference value; and
    generating the comparing result according to the at least one seed position reference value, the first seed, and the second seed.

11. The method of claim 9, wherein the step of generating the comparing result according to the first seed and the second seed further comprises:
    providing a seed position lookup table; and
    generating the comparing result according to the seed position lookup table, the first seed, and the second seed.

12. The method of claim 9, further comprising:
    receiving the receiving signal; and
    when the comparing result indicates that the time distance between the first seed and the second seed is smaller than a threshold, generating a reset signal to re-receive the receiving signal.

13. The method of claim 9, further comprising:
    generating a third seed to update the first seed.

14. The method of claim 9, further comprising:
    sending the transmission signal; and
    when the comparing result indicates that the time distance between the first seed and the second seed is smaller than a threshold, stopping sending the transmission signal for a predetermined time duration.

15. The method of claim 14, further comprising:
    re-sending the transmission signal for building up the network connection.

16. The method of claim 9, wherein the transmission signal comprises an idle sequence.

* * * * *